US011975534B2

(12) United States Patent
Martin et al.

(10) Patent No.: US 11,975,534 B2
(45) Date of Patent: May 7, 2024

(54) FLUID ACTUATOR EVALUATION BASED ON ACTUATOR ACTIVATION DATA

(71) Applicant: HEWLETT-PACKARD DEVELOPMENT COMPANY, L.P., Spring, TX (US)

(72) Inventors: Eric Martin, Corvallis, OR (US); Daryl E Anderson, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1136 days.

(21) Appl. No.: 16/613,959

(22) PCT Filed: Jul. 11, 2017

(86) PCT No.: PCT/US2017/041466

§ 371 (c)(1),
(2) Date: Nov. 15, 2019

(87) PCT Pub. No.: WO2019/013759

PCT Pub. Date: Jan. 17, 2019

(65) Prior Publication Data

US 2022/0379601 A1 Dec. 1, 2022

(51) Int. Cl.
*B41J 2/045* (2006.01)

(52) U.S. Cl.
CPC ......... *B41J 2/04536* (2013.01); *B41J 2/0458* (2013.01)

(58) Field of Classification Search
None
See application file for complete search history.

(56) References Cited

U.S. PATENT DOCUMENTS

| | | | |
|---|---|---|---|
| 6,336,701 | B1 | 1/2002 | Hickman |
| 6,712,438 | B2 | 3/2004 | Han |
| 7,344,227 | B2 | 3/2008 | King et al. |
| 7,370,933 | B2 | 5/2008 | Kusakari et al. |
| 7,614,717 | B2 | 11/2009 | Deng |
| 8,371,676 | B2 | 2/2013 | Shinkawa et al. |

(Continued)

FOREIGN PATENT DOCUMENTS

| | | | |
|---|---|---|---|
| CN | 1683159 | A | 10/2005 |
| CN | 101132917 | | 2/2008 |

(Continued)

OTHER PUBLICATIONS

Diagnostic Nozzle Print, 2013 <https://dgs.oce.com/PrinterSupport/T220_Customer/WebHelp/-M028523.htm >.

*Primary Examiner* — Scott A Richmond
(74) *Attorney, Agent, or Firm* — Foley & Lardner LLP

(57) ABSTRACT

In one example in accordance with the present disclosure, a fluidic die is described. The fluidic die includes an array of fluid actuators grouped into primitives. The fluidic die also includes a fluid actuator controller to selectively activate fluid actuators via activation data. The fluidic die also includes an array of actuator evaluators, wherein each actuator evaluator of the fluidic die is coupled to a subset of the array of fluid actuators. The actuator evaluators selectively evaluate an actuator characteristic of a selected fluid actuator based on: an output of an actuator sensor paired with the selected fluid actuator, the activation data, and an evaluation control signal.

15 Claims, 5 Drawing Sheets

(56) References Cited

U.S. PATENT DOCUMENTS

| | | | | |
|---|---|---|---|---|
| 2005/0225585 | A1 | 10/2005 | Takizawa et al. | |
| 2008/0084454 | A1 | 4/2008 | Sheahan | |
| 2008/0111844 | A1* | 5/2008 | Walmsley | B41J 2/04505 347/13 |
| 2009/0174753 | A1 | 7/2009 | Kurokawa et al. | |
| 2009/0244132 | A1 | 10/2009 | Bruce | |
| 2017/0106646 | A1 | 4/2017 | Anderson | |
| 2017/0348968 | A1 | 12/2017 | Anderson et al. | |

FOREIGN PATENT DOCUMENTS

| | | | |
|---|---|---|---|
| CN | 101678675 | | 3/2010 |
| CN | 205310832 | U | 6/2016 |
| CN | 106255598 | | 12/2016 |
| CN | 106660367 | | 5/2017 |
| EP | 3137302 | | 3/2017 |
| WO | WO-2016068888 | | 5/2016 |
| WO | WO-2016130157 | | 8/2016 |
| WO | WO-2017023246 | | 2/2017 |
| WO | WO-2017023291 | | 2/2017 |

* cited by examiner

FLUID ACTUATOR EVALUATION BASED ON ACTUATOR ACTIVATION DATA

BACKGROUND

A fluidic die is a component of a fluid ejection system that includes a number of fluid ejecting nozzles. The fluidic die can also include other non-ejecting actuators such as micro-recirculation pumps. Through these nozzles and pumps, fluid, such as ink and fusing agent among others, is ejected or moved. Over time, these nozzles and pumps can become clogged or otherwise inoperable. As a specific example, ink in a printing device can, over time, harden and crust. This can block the nozzle and interrupt the operation of subsequent ejection events. Other examples of issues affecting these actuators include fluid fusing on an ejecting element, particle contamination, surface puddling, and surface damage to die structures. These and other scenarios may adversely affect operations of the device in which the fluidic die is installed.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
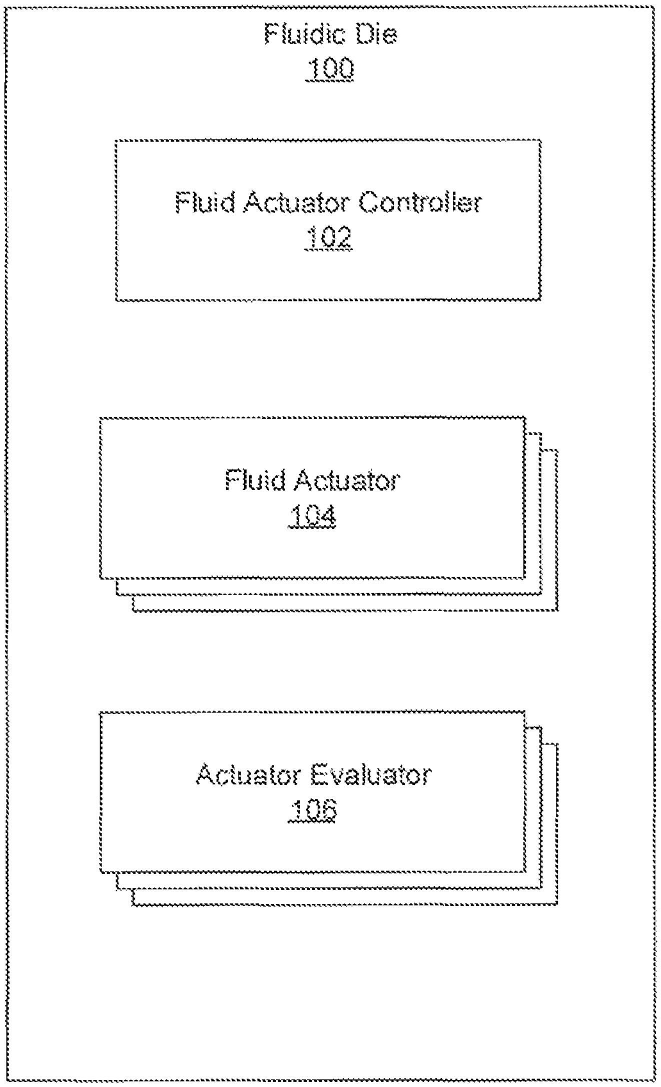
FIG. 1 is a block diagram of a fluidic die for fluid activator evaluation based on actuator activation data, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Fluidic dies, as used herein, may describe a variety of types of integrated devices with which small volumes of fluid may be pumped, mixed, analyzed, ejected, etc. Such fluidic dies may include ejection dies, such as printheads, additive manufacturing distributor components, digital titration components, and/or other such devices with which volumes of fluid may be selectively and controllably ejected. Other examples of fluidic dies include fluid sensor devices, lab-on-a-chip devices, and/or other such devices in which fluids may be analyzed and/or processed.

In a specific example, these fluidic systems are found in any number of printing devices such as inkjet printers, multi-function printers (MFPs), and additive manufacturing apparatuses. The fluidic systems in these devices are used for precisely, and rapidly, dispensing small quantities of fluid. For example, in an additive manufacturing apparatus, the fluid ejection system dispenses fusing agent. The fusing agent is deposited on a build material, which fusing agent facilitates the hardening of build material to form a three-dimensional product.

Other fluid ejection systems dispense ink on a two-dimensional print medium such as paper. For example, during inkjet printing, fluid is directed to a fluid ejection die. Depending on the content to be printed, the device in which the fluid ejection system is disposed determines the time and position at which the ink drops are to be released/ejected onto the print medium. In this way, the fluid ejection die releases multiple ink drops over a predefined area to produce a representation of the image content to be printed. Besides paper, other forms of print media may also be used.

Accordingly, as has been described, the systems and methods described herein may be implemented in a two-dimensional printing, i.e., depositing fluid on a substrate, and in three-dimensional printing, i.e., depositing a fusing agent or other functional agent on a material base to form a three-dimensional printed product.

Returning to the fluid actuators, a fluid actuator may be disposed in a nozzle, where the nozzle includes a fluid chamber and a nozzle orifice in addition to the fluid actuator. The fluid actuator in this case may be referred to as an ejector that, upon actuation, causes ejection of a fluid drop via the nozzle orifice.

Fluid actuators may also be pumps. For example, some fluidic dies include microfluidic channels. A microfluidic channel is a channel of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.). Fluidic actuators may be disposed within these channels which, upon activation, may generate fluid displacement in the microfluidic channel.

Examples of fluid actuators include a piezoelectric membrane based actuator, a thermal resistor based actuator, an electrostatic membrane actuator, a mechanical/impact driven membrane actuator, a magneto-strictive drive actuator, or other such elements that may cause displacement of fluid responsive to electrical actuation. A fluidic die may include a plurality of fluid actuators, which may be referred to as an array of fluid actuators.

The array of fluid actuators may be formed into groups referred to as "primitives." A primitive generally includes a group of fluid actuators that each have a unique actuation address. In some examples, electrical and fluidic constraints of a fluidic die may limit which fluid actuators of each primitive may be actuated concurrently for a given actuation event. Therefore, primitives facilitate addressing and subsequent actuation of fluid ejector subsets that may be concurrently actuated for a given actuation event.

A number of fluid ejectors corresponding to a respective primitive may be referred to as a size of the primitive. To illustrate by way of example, if a fluidic die has four primitives and each respective primitive has eight respective fluid actuators (the different fluid actuators having an address 0 to 7), the primitive size is eight. In this example, each fluid actuator within a primitive has a unique in-primitive address. In some examples, electrical and fluidic constraints limit actuation to one fluid actuator per primitive. Accordingly, a total of four fluid actuators (one from each primitive) may be concurrently actuated for a given actuation event. For example, for a first actuation event, the respective fluid actuator of each primitive having an address of 0 may be actuated. For a second actuation event, the respective fluid actuator of each primitive having an address of 1 may be actuated. In some examples, the primitive size may be fixed and in other examples the primitive size may vary, for example after the completion of a set of actuation events.

While such fluid ejection systems and dies undoubtedly have advanced the field of precise fluid delivery, some conditions impact their effectiveness. For example, the actuators on a die are subject to many cycles of heating, drive bubble formation, drive bubble collapse, and fluid replenishment from a fluid reservoir. Over time, and depending on other operating conditions, the actuators may become blocked or otherwise defective. As the process of depositing fluid on a surface is a precise operation, these blockages can have a deleterious effect on print quality. If one of these fluid actuators fail, and is continually operating following failure, then it may cause neighboring actuators to fail.

Accordingly, the present specification is directed to a fluidic die that 1) determines the state of a particular fluid actuator, 2) allows for variable and fixed primitive sizes, and 3) re-purposes activation data to initialize evaluation. That is, to actuate a fluid actuator, or set of fluid actuators, activation data is passed to the fluid actuator. This same data can, at another point in time, be used to activate an actuator evaluator to perform an evaluation of a state of the particular fluid actuator.

Specifically, the present specification describes a fluidic die. The fluidic die includes an array of fluid actuators grouped into primitives. A fluid actuator controller selectively activates fluid actuators via activation data. The fluidic die also includes an array of actuator evaluators. Each actuator evaluator is coupled to a subset of fluid actuators. The actuator evaluators evaluate a state of a selected fluid actuator based on 1) an output of an actuator sensor paired with the selected fluid actuator, 2) the activation data, and 3) an evaluation control signal.

In another example, a fluidic die includes an array of fluid actuators grouped into primitives, wherein one fluid actuator from each primitive is selected for activation at a time. The fluidic die also includes an array of actuator sensors to receive a signal indicative of a state of a fluid actuator. Each actuator sensor is coupled to a respective fluid actuator. The fluidic die also includes a fluid actuator controller to selectively actuate a subset of the array of fluid actuators. The fluidic die also includes an array of actuator evaluators. Each actuator evaluator is grouped with a subset of fluid actuators from the array. The actuator evaluator evaluates an actuator state of a selected fluid actuator during a non-image forming evaluation mode defined by an evaluation control signal. The evaluation is based on an output of an actuator sensor paired with the fluid actuator, the activation data, and the evaluation control signal.

The present application also describes a method. According to the method, a non-image forming evaluation mode of a fluidic die is activated by passing an evaluation control signal to the fluidic die. A fluid actuator to activate is indicated and the fluid actuator is activated based on activation data. The activation generates a sense voltage measured at a corresponding actuator sensor. A state of the fluid actuator is evaluated at an actuator evaluator based on the sense voltage and the activation data.

In one example, using such a fluidic die 1) allows for actuator evaluation circuitry to be included on a die as opposed to sending sensed signals to actuator evaluation circuitry off die; 2) increases the efficiency of bandwidth usage between the device and die; 3) reduces computational overhead for the device in which the fluid ejection die is disposed; 4) provides improved resolution times for malfunctioning actuators; 5) allows for actuator evaluation in one primitive while allowing continued operation of actuators in another primitive; and 6) places management of nozzles on the fluid ejection die as opposed to on the printer in which the fluid ejection die is installed, 7) accommodates for variation in primitive size, and 8) re-purposes activation data to perform evaluation. However, it is contemplated that the devices disclosed herein may address other matters and deficiencies in a number of technical areas.

As used in the present specification and in the appended claims, the term "actuator" refers a nozzle or another non-ejecting actuator. For example, a nozzle, which is an actuator, operates to eject fluid from the fluid ejection die. A recirculation pump, which is an example of a non-ejecting actuator, moves fluid through the fluid slots, channels, and pathways within the fluid ejection die.

Accordingly, as used in the present specification and in the appended claims, the term "nozzle" refers to an individual component of a fluid ejection die that dispenses fluid onto a surface. The nozzle includes at least an ejection chamber, an ejector, and a nozzle orifice.

Further, as used in the present specification and in the appended claims, the term "fluidic die" refers to a component of a fluid ejection system that includes a number of fluid actuators. Groups of fluid actuators are categorized as "primitives" of the fluidic die, the primitive having a size referring to the number of fluid actuators grouped together. In one example, a primitive size may be between 8 and 16. The fluid ejection die may be organized first into two columns with 30-150 primitives per column.

Still further, as used in the present specification and in the appended claims, the term "actuation event" refers to a concurrent actuation of fluid actuators of the fluidic die to thereby cause fluid displacement.

Yet further, as used in the present specification and in the appended claims, the term "activation data" refers to data that targets a particular fluid actuator or set of fluid actuators for actuation. For example, when primitive size varies, activation data may include per-actuator actuation data and mask data. In another example, when primitive size is fixed, activation data may include per-primitive actuation data and an address for a target fluid actuator.

Yet further, as used in the present specification and in the appended claims, the number of elements in a "subset" and "array" may be 1 or any integer value greater than 1.

Even further, as used in the present specification and in the appended claims, the term "a number of" or similar language is meant to be understood broadly as any positive number including 1 to infinity.

Turning now to the figures, FIG. 1 is a block diagram of a fluidic die (100) for fluid actuator evaluation based on actuator activation data, according to an example of the principles described herein. As described above, the fluidic die (100) is part of a fluid ejection system that houses components for ejecting fluid and/or transporting fluid along various pathways. The fluid that is ejected and moved throughout the fluidic die (100) can be of various types including ink, biochemical agents, and/or fusing agents. The fluid is moved and/or ejected via an array of fluid actuators (104). Any number of fluid actuators (104) may be formed on the fluidic die (100).

The fluid actuators (104) may be of varying types. For example, the fluidic die (100) may include an array of nozzles, wherein each nozzle includes a fluid actuator (104)

that is an ejector. In this example, a fluid ejector, when activated, ejects a drop of fluid through a nozzle orifice of the nozzle.

Another type of fluid actuator (104) is a recirculation pump that moves fluid between a nozzle channel and a fluid slot that feeds the nozzle channel. In this example, the fluidic die includes an array of microfluidic channels. Each microfluidic channel includes a fluid actuator (104) that is a fluid pump. In this example, the fluid pump, when activated, displaces fluid within the microfluidic channel. While the present specification may make reference to particular types of fluid actuators (104), the fluidic die (100) may include any number and type of fluid actuators (104).

The fluid actuators (104) are grouped into primitives. As described above, a primitive refers to a grouping of fluid actuators (104) where each fluid actuator (104) within the primitive has a unique address. For example, within a first primitive, a first fluid actuator (104) has an address of 0, a second fluid actuator (104) has an address of 1, a third fluid actuator (104) has an address of 2, and a fourth fluid actuator (104) of the primitive has an address of 3. The fluid actuators (104) that are grouped into subsequent primitives respectively have similar addressing. A fluidic die (100) may include any number of primitives having any number of fluid actuators (104) disposed therein. In some cases, a quantity of fluid actuators (104) within the primitive that can be concurrently fired may be designated. For example, it may be designated that in a given primitive, one fluid actuator (104) is enabled at a time.

The fluidic die (100) also includes a fluid actuator controller (102) to selectively activate fluid actuators (104). That is, the fluid actuator controller (102) receives a fire signal, which is selectively passed to select fluid actuators (104) based on activation data. Put another way, the activation data gates a fire signal to pass to a desired primitive and fluid actuator (104).

The activation data may take many forms. For example, the number of fluid actuators (104) within a primitive may vary. If the number of fluid actuators (104) within a primitive is not fixed, i.e., it varies, then the activation data may include 1) actuator data that indicates a set of fluid actuators (104) to activate for a set of actuation events and 2) mask data that indicates fluid actuators (104) to activate for a particular activation event.

In the case where the number of fluid actuators (104) within a primitive is fixed, then the activation data may include a first signal that activates the entire primitive, and an address that targets a particular fluid actuator (104) within the primitive.

The fluidic die (100) also includes an array of actuator evaluators (106). Each actuator evaluator (106) is coupled to a subset of fluid actuators (104) of the array. The actuator evaluators (106) evaluate a state of any fluid actuator (104) within the subset that pertains to that actuator evaluator (106) and generates an output indicative of the fluid actuator (104) state. Note that the primitive grouping does not necessarily align with the group of fluid actuators (104) that are coupled to an actuator evaluator (106).

The activation of an actuator evaluator (106) is based on various components. For example, the actuator evaluator (106) is activated via an evaluation control signal. That is, when it is desired that an actuator analysis be performed on a particular fluid actuator (104) or set of fluid actuators (04), an evaluation control signal is passed to an actuator evaluator (106), which indicates that an evaluation of a particular fluid actuator (104) is desired.

The actuator evaluator (106) is also activated based on the activation data. That is, the same data, or a portion of the same data, that causes the fluid actuator (104) to carry out an operation during printing, also causes the actuator evaluator (106) to carry out an evaluation. In other words, the output of the actuator sensor is used to determine an actuator state, but the timing of the analysis is based on when 1) an evaluation control signal is received at the actuator evaluator and 2) the corresponding fluid actuator (104) is active as indicated by the activation data received at the actuator evaluator (106). Put yet another, way, the activation data and the evaluation control signal gate the passing of the output of the actuator sensor to be used in actuator evaluation.

In other words, the fluidic die (100) described herein allows for evaluation via an evaluation control signal, but at a predetermined time, i.e., activation of a particular fluid actuator (104) as indicated by the activation data. For example, in some cases, a fire signal and activation data may be sent to a fluid actuator (104), but the evaluation of the fluid actuator (104) may occur at a later point in time after the actuation has completed. Accordingly, the actuator evaluator (106) may include storage elements for one or both of the evaluation control signal and the activation data. Put yet another way, the activation data used to activate the various fluid actuators (104) is the same data that is used, in part, to select an actuator evaluator (106) to determine a state of the fluid actuator (104).

In some examples, fluid actuator evaluation occurs during a non-imaging period of operation. That is, when the fluidic die (100) is in an evaluation mode, the array of fluid actuators (104) are actuating, but do not form part of an image. By comparison, when the fluidic die (100) is in a printing mode, the array of fluid actuators (104) are actuating to form part of an image. That is, dedicated actuation events are executed during actuator evaluation.

In some examples, this non-image forming evaluation period during which actuator evaluation is carried out is defined by the evaluation control signal. That is, a controller may include information regarding the deposition of fluid to form an image. During this time, an evaluation control signal is not passed to the actuator evaluators (106). However, when an image is not actively being formed, the evaluation control signal may be passed to the actuator evaluator (106) to signal actuator evaluation is to occur. Note that during the printing mode, and the non-image forming evaluation mode, activation data is continually passed to the fluid actuator controller (102) in a predetermined fashion.

Such a fluidic die (100) is efficient in that it re-purposes activation data and circuitry for fluid actuator (104) evaluation, saving space on the fluidic die (100). Moreover, it may be advantageous to have one fluid actuator (104) per actuator evaluator (106) evaluated at a time. As activation data may be designated to activate a single fluid actuator (104) per primitive at a time, the re-purposing of the single actuator activation data would also ensure that a single fluid actuator (104) per actuator evaluator (106) is evaluated at a time.

Figure 2:
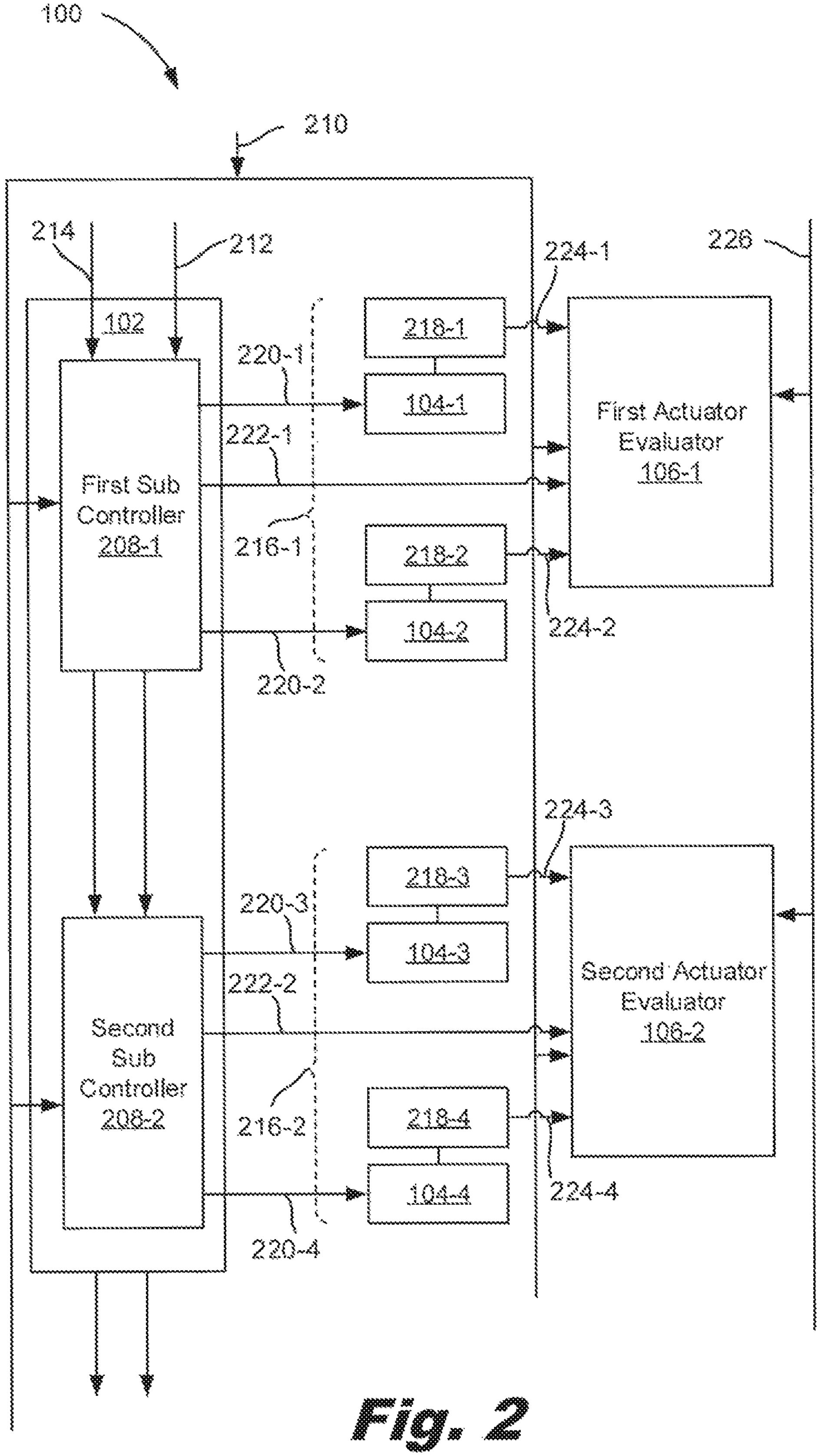
FIG. 2 is a diagram of a fluidic die for fluid actuator evaluation based on actuator activation data, according to another example of the principles described herein.

FIG. 2 is a diagram of a fluidic die (100) for fluid actuator evaluation based on actuator activation data, according to another example of the principles described herein. Specifically, FIG. 2 depicts a scenario where the number of fluid actuators (104) within a primitive (216) is fixed. That is, FIG. 2 depicts a first primitive (216-1) having two fluid actuators (104-1, 104-2) and a second primitive (216-2) having two fluid actuators (104-3, 104-4). While FIG. 2 depicts two primitives (216) with two fluid actuators (104)

each, a primitive (216) may have any number of fluid actuators (104). In this example, the number of fluid actuators (104) within a primitive does not change over time.

Paired with each fluid actuator (104) is an actuator sensor (218). The actuator sensors (218) receive a signal indicative of a state of a corresponding fluid actuator (104). For example, a first actuator sensor (218-1) is paired with and receives a signal indicative of a state of, a first fluid actuator (104-1). Similarly, the second, third and fourth actuator sensors (218-2, 218-3, 218-4) are paired with, and receive signals indicative of a state of a second, third, and fourth fluid actuator (104-2, 104-3, 104-4), respectively. Accordingly, once a particular fluid actuator (104), i.e., fluid pump or fluid ejector, has been activated, a corresponding sensor (218) collects information regarding the state of that fluid actuator (104).

As a specific example, the actuator sensors (218) may be drive bubble detectors that detect the presence of a drive bubble within a chamber in which the fluid actuator (104) is disposed. That is, a drive bubble is generated by a fluid actuator (104) to move fluid.

As a specific example, in thermal inkjet printing, a thermal ejector heats up to vaporize a portion of fluid in a chamber. As the bubble expands, it forces fluid out of a nozzle orifice, or through a microfluidic channel in the case of microfluidic pumps. As the bubble collapses, a negative pressure within the chamber draws fluid from the fluid feed slot of the fluidic die (100). Sensing the proper formation and collapse of such a drive bubble can be used to evaluate whether a particular fluid actuator (104) is operating as expected. That is, a blockage will affect the formation of the drive bubble. If a drive bubble has not formed as expected, it can be determined that the chamber is blocked and/or not working in the intended manner.

The presence of a drive bubble can be detected by measuring impedance values within the chamber at different points in time. That is, as the vapor that makes up the drive bubble has a different conductivity than the fluid that otherwise is disposed within the chamber, when a drive bubble exists in the chamber, a different impedance value will be measured. Accordingly, a drive bubble detection device measures this impedance and outputs a corresponding voltage. As will be described below, this output can be used to determine whether a drive bubble is properly forming and therefore determine whether the corresponding nozzle or pump is in a functioning or malfunctioning state. This output can be used to trigger subsequent fluid actuator (104) management operations. While description has been provided of an impedance measurement other characteristics may be measured to determine the characteristic of the corresponding fluid actuator (104).

The drive bubble detection devices may include a single electrically conductive plate, such as a tantalum plate, which can detect an impedance of whatever medium is within the chamber. Specifically, each drive bubble detection device measures an impedance of the medium within the chamber, which impedance measure can indicate whether a drive bubble is present in the chamber. The drive bubble detection device then outputs a first voltage value indicative of a state, i.e., drive bubble formed or not, of the corresponding fluid actuator (104). This output can be compared against a threshold voltage to determine whether the fluid actuator (104) is malfunctioning or otherwise inoperable. Note, that as depicted in FIG. 2, in some examples, the actuator sensors (218) are uniquely paired with a corresponding fluid actuator (104), i.e., fluid pump and/or fluid ejector and that a single actuator evaluator (106) is shared among all the fluid actuators (104) within the subset.

In this example where the number of fluid actuators (104) in a primitive (216) is fixed, the fluid actuator controller (102) includes sub-controllers (208) per primitive (216). That is, a first sub-controller (208-1) corresponds to, and controls, a first primitive (216-1), and a second sub-controller (208-2) corresponds to, and controls, a second primitive (216-2). As described above, fluid actuators (104) are activated via activation data. That is, an ire signal (214) is propagated down to all sub-controllers (208), but just those primitives (216-1) that are selected by actuation data are activated. Accordingly, per-primitive actuation data (212) is shifted down through the sub-controllers (208) and a particular sub-controller (208) is activated via this per-primitive actuation data (212). A particular actuator (104) of that primitive (216) is targeted via an address (210) passed to the sub-controllers (208). That is, if a first actuator (104-1) of the first primitive (216-1) is to be activated, a per-primitive actuation data (212) is passed that activates the first primitive (216-1), and an address (210) passed that targets the first fluid actuator (104-1). In other words, the activation data that activates a particular fluid actuator includes 1) the per-primitive actuation data (212) that activates the corresponding primitive and 2) an address (210) for a particular fluid actuator (104) to be actuated When a selected primitive (216-1, 216-2) is selected via the per-primitive actuation data (212) and a particular fluid actuator (104-1, 104-2, 104-3, 104-4) is selected via art address (210), the particular fluid actuator is activated via a local fire signal (220-1, 220-2, 220-3, 220-4) which is the fire signal (214) gated by the per-primitive actuation data signal (212) and address (210).

Once a particular fluid actuator (104) has been activated, the corresponding sensor (218-1, 218-2, 218-3, 218-4) sends an output (224-1, 224-2, 224-3, 224-4) to the corresponding actuator evaluator (108-1, 106-2). If the actuator evaluator (106-1, 106-2) has been selected via the evaluation control signal (226) and a primitive fire signal (222-1, 222-2), then the particular fluid actuator (104) is evaluated, which particular fluid actuator (104) is indicated by the address (210) received at the actuator evaluator (106). The primitive fire signal (222-1) may reflect the first signal (214) that is gated by the corresponding sub-controller (208-1) and the actuation data (212).

A specific example is now presented in which the second fluid actuator (104-2) is to be evaluated. In this example, during a printing period, the first sub-controller (208-1) receives 1) the fire signal (214) which is gated by the per-primitive actuation data (212) which activates the first primitive (216-1) and the address (210) which targets the second fluid actuator (104-2). With the per-primitive actuation data (212) indicating the first primitive (216-1) and the address indicating the second fluid actuator (104-2), a local fire signal (220-2) causes the second fluid actuator (104-2) to dispel an amount of fluid. Note that as this is in a printing mode, the first actuator evaluator (106-1) is inactive. That is, it has not received instruction via an evaluator control signal (226) to carry out actuator evaluation.

In this example, during an evaluation period, the first sub-controller (208-1) receives 1) the fire signal (214) which is gated by the per-primitive actuation data (212) which activates the first primitive (216-1) and the address (210) which targets the second fluid actuator (104-2). With the per-primitive actuation data (212) indicating the first primitive (216-1) and the address indicating the second fluid actuator (104-2), a local fire signal (220-2) causes the second fluid actuator (104-2) to dispel an amount of fluid. In this evaluation mode, the first actuator evaluator (106-1) receives an evaluation control signal (226) which activates it for actuator evaluation. An output (224-2) of the second sensor (218-2) coupled to the second fluid actuator (104-2) is received as well as a primitive fire signal (222-1) and an address (210) for the second fluid actuator (104-2) and the first actuator evaluator (106-1) determines a state of the second fluid actuator (104-2). In this instance, when the first actuator evaluator (106-1) is active, then other actuator evaluators (106) are inactive.

Figure 3:
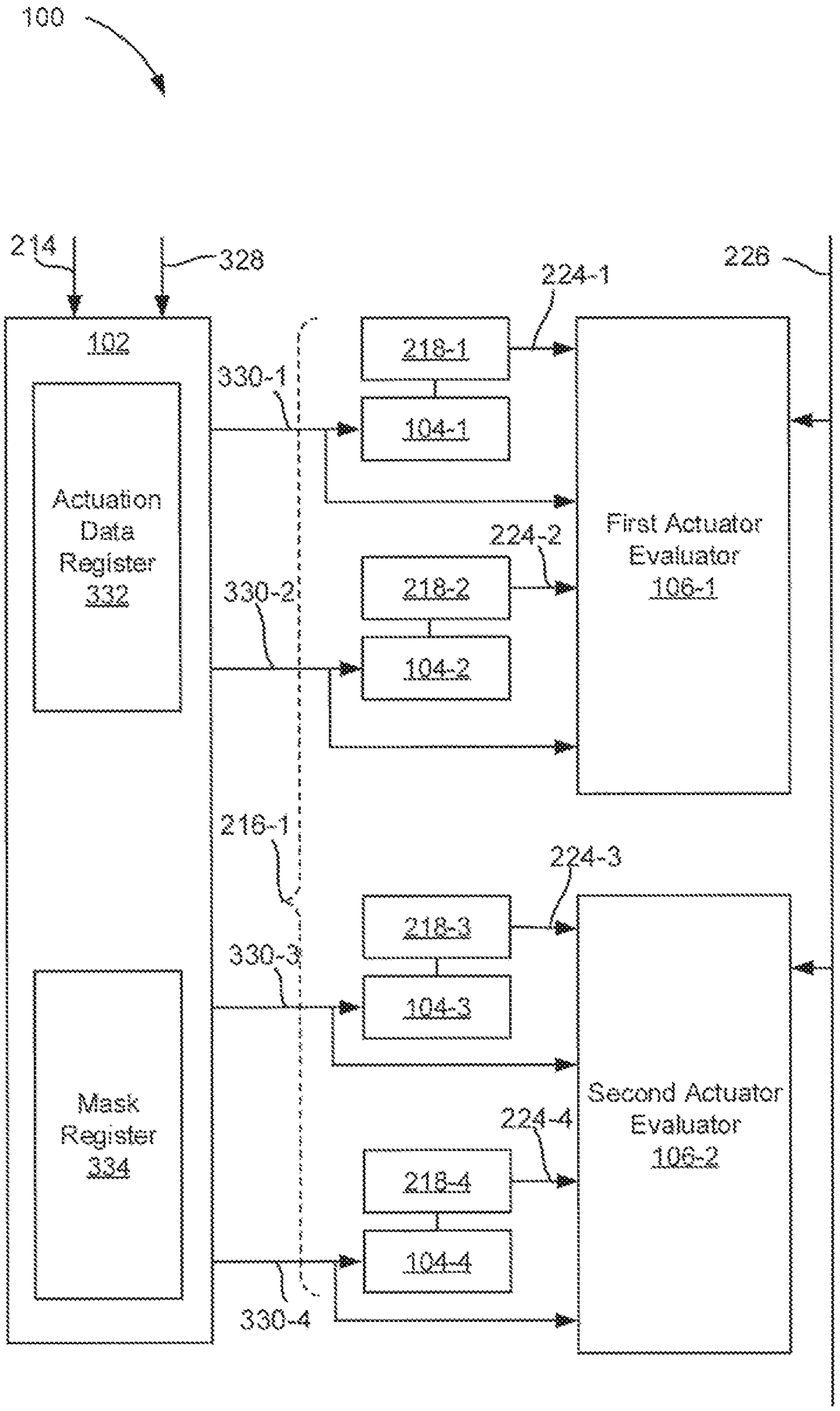
FIG. 3 is a diagram of a fluidic die for fluid actuator evaluation based on actuator activation data, according to another example of the principles described herein.

FIG. 3 is a diagram of a fluidic die (100) for fluid actuator (104) evaluation based on actuator activation data (328), according to another example of the principles described herein. Specifically, FIG. 3 depicts a scenario where the number of fluid actuators (104) within a primitive (216) varies.

In this example, the fluid actuator controller (102) includes an actuation data register (332) and a mask register (334). The actuation data register (332) stores actuation data that indicates fluid actuators (104) to actuate for a set of actuation events. For example, the actuation data register (332) may include a set of bits to store actuation data, where each respective bit of the actuation data register (332) corresponds to a respective fluid actuator (104-1 through 104-4). For those fluid actuators (104) that are to be actuated for a set of actuation events, the corresponding respective bit can be set to one. For those fluid actuators (104) that are not to be actuated for the set of actuation events, the corresponding respective bit can be set to zero.

The mask register (334) stores mask data that indicates a subset of fluid actuators (104) of the array of fluid actuators (104) enabled for actuation for a particular actuation event of the set of actuation events. For example, the mask register (334) may include a set of bits to store mask data, where each respective bit of the mask register (334) corresponds to a respective fluid actuator (104-1 through 104-4). For those fluid actuators (104) that are to be actuated for a particular actuation event, the corresponding respective bit can be set to one. For those fluid actuators (104) that are not to be actuated for the particular actuation events, the corresponding respective bit can be set to zero. In so doing, the mask register (334) configures the size of the primitives (216).

Note that over time, the primitive (216) size may change based on the information presented in the mask register (334). That is, the primitive (216) size is not fixed. At different points in time, the mask data may change, such that the fluid actuator controller (102) facilitates variable primitive (216) sizes. For example, for a first set of actuation events, fluid actuators (104) may be arranged in primitives (216) of a first primitive size, as defined by first mask data stored in the mask register (334), and for a second set of actuation events, second mask data may be loaded into the mask register (334) such that fluid actuators (104) may be arranged in primitives (216) of a second primitive size. Accordingly, the fluid actuator controller (102) facilitates concurrent actuation of different arrangements of fluid actuators (104) based on the mask data of the mask register (334). In some examples, the mask data groups fluid actuators (104), and thereby defines the primitives (216). While FIG. 3 depicts a primitive (216) having four fluid actuators (104-1, 104-2, 104-3, 104-4), the primitive (216) may have any number of fluid actuators (104), which number may vary over time. Paired with each fluid actuator (104) is an actuator sensor (218) as described above.

The fluid actuator controller (108) may also include actuation logic. The actuation logic is coupled to the actuation data register (332) and the mask register (334) to determine which fluid actuators (104) to actuate for a particular actuation event. The actuation logic is also coupled to the fluid actuators (104) to electrically actuate those fluid actuators (104) selected for actuation based on the actuation data register (332) and the mask register (334).

The fluid actuator controller (108) may also include mask control logic to shift mask data stored in the mask register (334) responsive to the performance of a particular actuation event of a set of actuation events. By shifting the mask data, different fluid actuators (104) are indicated to actuation of a subsequent actuation event of the set of actuation events. To effectuate such shifting, the mask control logic may include a shift count register to store a shift pattern that indicates a number of shifts that are input into the mask register (334) and a shift state machine which inputs a shift clock to cause the shifting indicated in the shift count register.

As described above, fluid actuators (104) are activated via activation data (328) signal. That is, a fire signal (214) is propagated to the fluid actuator controller (102) and then a particular fluid actuator (104) is selected via actuation data and mask data represented collectively as actuation data (328). That is, actuation data (328) is received at the fluid actuator controller (328) which indicates a set of fluid actuators (104) to activate for a set of actuation events and a respective bit populated to the mask register (334) which indicates whether a particular fluid actuator (104) is enabled for actuation for a particular actuation event.

When a selected fluid actuator (104) is selected via the activation data (328), the particular fluid actuator (104) is activated via a local per-actuator fire signal (330-1, 330-2, 330-3, 330-4). That is, the local per-actuator fire signal (330) is the fire signal (214) gated by the actuation data (328). Once a particular actuator (104) has been activated, the corresponding sensor (218-1, 218-2, 218-3, 218-4) sends an output (224-1, 224-2, 224-3, 224-4) to the corresponding actuator evaluator (106-1, 106-2). If the actuator evaluator (106-1, 106-2) has been selected via the evaluation control signal (226) and the per-actuator fire signal (330-1, 330-2, 330-3, 330-4), then the particular fluid actuator (104) is evaluated.

A specific example is now presented in which the third fluid actuator (104-3) is to be activated. In this example, during a printing period, the actuation data register (332) and the mask register (334) are populated via the actuation data (328). A fire signal (214) is gated by the actuation data register (332) and the mask register (334) which indicate the third fluid actuator (104-3) as being selected for activation. Next, a per-actuator local fire signal (330-3) causes the third fluid actuator (104-3) to dispel an amount of fluid. Note that as this is in a printing mode, the second actuator evaluator (106-2) is inactive. That is, it has not received instruction via an evaluation control signal (226) to carry out actuator evaluation.

In this example, during an evaluation period, the fluid actuator controller (102) receives 1) the fire signal (214) which is gated by the actuation data register (332) and the mask register (334). This gating allows the per-actuator local fire signal (330-3) to activate the third fluid actuator (104-3) to dispel an amount of fluid. In this evaluation mode, the second actuator evaluator (106-2) receives an evaluation control signal (226) which activates it for actuator evaluation. An output (224-3) of the third sensor (218-3) coupled to the third fluid actuator (104-3) is received as well as the per-actuator fire signal (330-3). With this information, the second actuator evaluator (106-2) has information for evaluation and has been instructed to evaluate per the evaluation control signal (226) and the per-actuator local fire signal (330-3). In this instance, the same data, i.e., per-actuator fire signal (330), used to actuate a fluid actuator (104) to manipulate fluid is used to initialize an actuator evaluation. In this instance, when the second actuator evaluator (106-2) is active, then other actuator evaluators (106) are inactive.

Figure 4:
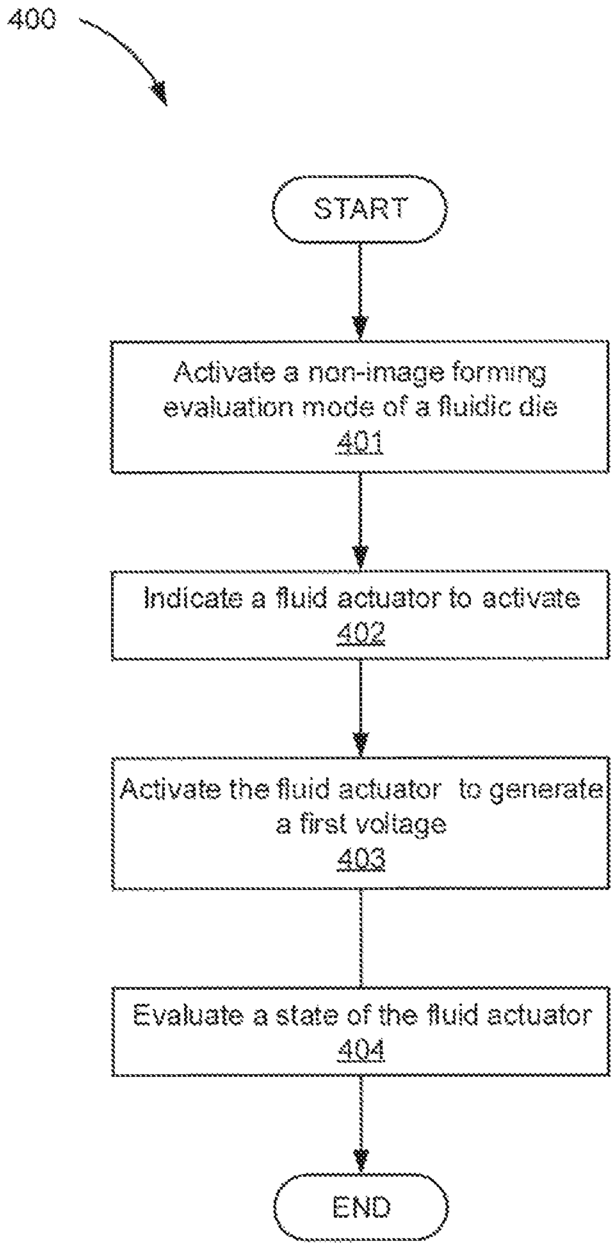
FIG. 4 is a flow chart of a method for fluid actuator evaluation based on actuator activation data, according to an example of the principles described herein.

FIG. 4 is a flow chart of a method (400) for fluid actuator evaluation based on actuator activation data, according to an example of the principles described herein. According to the method (400), a non-image forming evaluation mode of a fluidic die (FIG. 1, 100) is activated (block 401). During the non-image forming evaluation mode, the actuator evaluators (FIG. 1, 106) are active for evaluation. By comparison, during image forming printing modes, the actuator evaluators (FIG. 1, 100) are not active for evaluation. Activating (block 401) this mode may be effectuated by passing an evaluation control signal (FIG. 2, 226) to the fluidic die (FIG. 1, 100).

A fluid actuator (FIG. 1, 104) or set of fluid actuators (FIG. 1, 104) to be evaluated are indicated (block 402). This may occur in different ways. For example, if the number of fluid actuators (FIG. 1, 104) within a primitive (FIG. 2, 216) are fixed, such indication (block 402) includes passing an address (FIG. 2, 210) to the actuator evaluator (FIG. 1, 106) and actuation data (FIG. 2, 212) which is passed to the actuator evaluator (FIG. 1, 106). If the number of fluid actuators (FIG. 1, 104) within a primitive (FIG. 2, 216) varies, such indication (block 402) includes setting a respective bit in the mask register (FIG. 3, 334) for the fluid actuator (FIG. 1, 104) to be evaluated and setting a respective bit in the actuation data register (FIG. 3, 332) for the fluid actuator (FIG. 1, 104) to be evaluated, which respective bits are then passed to the actuator evaluator (FIG. 1, 106).

With the fluid actuator (FIG. 1, 104) to be evaluated indicated (block 402), the selected fluid actuator (FIG. 1, 104) is activated (block 403). For example, in thermal inkjet printing, the heating element in a thermal ejector is heated so as to generate a drive bubble that forces fluid out the nozzle orifice. Doing so generates a sense voltage output by the corresponding actuator sensor (FIG. 2, 218), which output is indicative of an impedance measure at a particular point in time within the ejection chamber.

An actuator state is then evaluated (block 404). In this example, the sense voltage is used to determine the state of the fluid actuator (FIG. 1, 104), and the activation data activates the actuator evaluator (FIG. 1, 106).

In some examples, evaluating (block 404) a state of the fluid actuator (FIG. 1, 104) includes comparing the sense voltage, i.e., the output of the sensor (FIG. 2, 218) against a threshold voltage. In this example, the threshold voltage may be selected to clearly indicate a blocked, or otherwise malfunctioning, fluid actuator (FIG. 1, 104). That is, the threshold voltage may correspond to an impedance measurement expected when a drive bubble is present in the chamber, i.e., the medium in the chamber at that particular time is fluid vapor. Accordingly, if the medium in the chamber were fluid vapor, then the received sense voltage would be comparable to the threshold voltage. By comparison, if the medium in the chamber is print fluid such as ink which may be more conductive than fluid vapor, the impedance would be lower, thus a lower voltage would be present. Accordingly, the threshold voltage is configured such that a voltage lower than the threshold indicates the presence of fluid, and a voltage higher than the threshold indicates the presence of fluid vapor. If the sense voltage is thereby greater than the threshold voltage, it may be determined that drive bubble is present and if the sense voltage is lower than the threshold voltage, it may be determined that a drive bubble is not present when it should be, and a determination made that the fluid actuator (FIG. 1, 104) is not performing as expected. While specific reference is made to output a low voltage to indicate low impedance, in another example, a high voltage may be output to indicate low impedance.

In another example, evaluating (block 404) a state of the fluid actuator (FIG. 1, 104) includes passing multiple instances of the output (FIG. 2, 224) to a controller for analysis. In this example, the multiple instances, received over time, may be analyzed to determine if the resulting sense profile indicates a healthy functioning fluid actuator (FIG. 1, 104) or a particular actuator malfunction.

Figure 5:
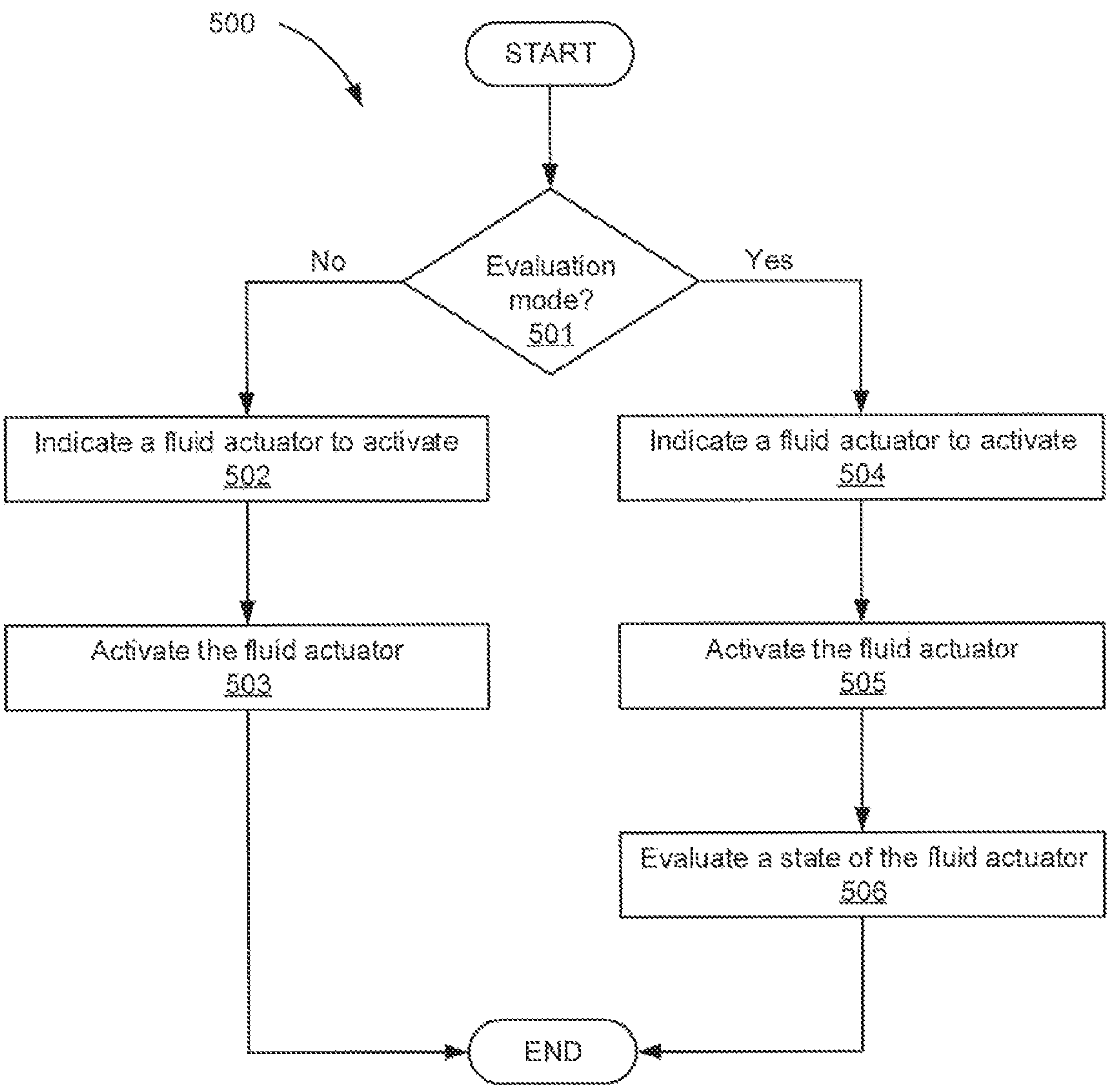
FIG. 5 is a flow chart of a method for fluid actuator evaluation based on actuator activation data, according to an example of the principles described herein.

FIG. 5 is a flow chart of a method (500) for fluid actuator evaluation based on actuator activation data, according to an example of the principles described herein. In this example, it is determined whether the fluidic die (FIG. 1, 100) is in an evaluation mode (block 501). If the fluidic die (FIG. 1, 100) is not in an evaluation mode (block 501, determination NO), then a fluid actuator (FIG. 1, 104) to be activated is indicated (block 502) and the indicated fluid actuator (FIG. 1, 104) activated (block 503). These operations may be carried out as described above in regards to FIG. 4. If the fluidic die (FIG. 1, 100) is in an evaluation mode (block 501, determination YES), then the fluid actuator (FIG. 1, 104) to be activated is indicated (block 504) and the indicated fluid actuator (FIG. 1, 104) activated (block 503). These also may be performed as described above in regards to FIG. 4.

As described above, such activation (block 505) generates a first voltage which is used to evaluate (block 506) a state of the fluid actuator (FIG. 1, 104) as described above in regards to FIG. 4, which evaluation is enabled by the evaluation control signal (FIG. 2, 216) and the same activation data used to activate tie fluid actuator (FIG. 1, 104). FIG. 5 as depicted illustrates that whether in an evaluation mode or in a printing mode, a fluid actuator (FIG. 1, 104) is identified and activated in the same fashion. The difference between the two modes, is that when in the evaluation mode, the actuator evaluator (FIG. 1, 106) is active so as to evaluate (block 506) a state of the fluid actuator (FIG. 1, 104). Whereas in the printing mode, the actuator evaluator (FIG. 1, 106) is not active. Doing so simplifies actuator evaluation as circuitry and activation data can be re-purposed to both 1) activate a fluid actuator (FIG. 1, 104) and enable an actuator evaluation.

In one example, using such a fluidic die 1) allows for actuator evaluation circuitry to be included on a die as opposed to sending sensed signals to actuator evaluation circuitry off die; 2) increases the efficiency of bandwidth usage between the device and die; 3) reduces computational overhead for the device in which the fluid ejection die is disposed; 4) provides improved resolution times for malfunctioning actuators; 5) allows for actuator evaluation in one primitive while allowing continued operation of actuators in another primitive; and 6) places management of nozzles on the fluid ejection die as opposed to on the printer in which the fluid ejection die is installed, 7) accommodates for variation in primitive size, and 8) re-purposes activation data to perform evaluation. However, it is contemplated that the devices disclosed herein may address other matters and deficiencies in a number of technical areas.

The preceding description has been presented to illustrate and describe examples of the principles described. This description is not intended to be exhaustive or to limit these principles to any precise form disclosed. Many modifications and variations are possible in light of the above teaching.

What is claimed is:

1. A fluidic die comprising:

an array of fluid actuators grouped into primitives;

a fluid actuator controller to selectively activate fluid actuators via activation data; and an array of actuator evaluators, each actuator evaluator coupled to a subset of fluid actuators, to selectively evaluate an actuator characteristic of a selected fluid actuator in response to receiving an output of an actuator sensor paired with the selected fluid actuator, the activation data, and an evaluation control signal.

2. The fluidic die of claim 1, wherein:

a size of each primitive is variable; and the fluid actuator controller comprises:

an actuation data register to store actuation data that indicates fluid actuators to actuate far a set of actuation events; and a mask register comprising a respective bit for each respective fluid actuator to store mask data that indicates a set of fluid actuators of the array enabled for actuation for a particular actuation event of the set of actuation events.

3. The fluidic die of claim 2, wherein the fluid actuator controller sends activation data comprising:

per-actuator actuation data; and the respective bit for each respective fluid actuator which indicates whether a fluid actuator is enabled for actuation for a particular actuation event of the set of actuation events.

4. The fluidic die of claim 1, wherein:

a size of each primitive is fixed;

the fluid actuator controller comprises a sub-controller per primitive to activate a corresponding primitive for a particular actuation event via a per-primitive actuation data; and each sub-controller receives an address to indicate a particular fluid actuator per primitive to activate.

5. The fluidic die of claim 4, wherein the fluid actuator controller sends an activation signal comprising:

the per-primitive actuation data; and the address for a particular fluid actuator to activate.

6. The fluidic the of claim 1, wherein the evaluation control signal defines a non-image forming period during which actuator evaluation is carried out.

7. The fluidic die of claim 1, wherein when a first actuator evaluator is active, other actuator evaluators are inactive.

8. A fluidic die comprising:

an array of fluid actuators grouped into primitives, wherein one fluid actuator from each primitive is activated at a time;

an array of actuator sensors to receive a signal indicative of a characteristic of a fluid actuator, wherein each actuator sensor is coupled to a respective fluid actuator;

a fluid actuator controller to selectively actuate a subset of the array of fluid actuators via actuation data; and an array of actuator evaluators, each actuator evaluator being grouped with a subset of fluid actuators from the array, to evaluate an actuator characteristic of a selected fluid actuator during a non-image forming evaluation mode defined by an evaluation control signal, in response to receiving an output of an actuator sensor paired with the fluid actuator, the activation data, and the evaluation control signal.

9. The fluidic die of claim 8, wherein:

when the fluidic die is in an evaluation mode, the array of fluid actuators are active but do not form part of an image; and when the fluidic die is in a printing mode, the array of fluid actuators are active and form part of an image.

10. The fluidic die of claim 8, wherein a size of the primitive varies.

11. A method comprising:

activating a non-image forming evaluation mode of a fluidic die by passing an evaluation control signal to the fluidic die;

indicating a fluid actuator to activate, activating the fluid actuator based on activation data to generate a sense voltage measured at a corresponding actuator sensor; and evaluating a state of the fluid actuator at the actuator evaluator based on the sense voltage.

12. The method of claim 11, wherein evaluating a state of the fluid actuator comprises passing multiple instances of the sense voltage to a controller for analysis.

13. The method of claim 11, wherein evaluating a state of the fluid actuator comprises comparing the sense voltage against a threshold voltage.

14. The method of claim 11, wherein indicating the fluid actuator to activate comprises passing an address a fluid actuator controller that activates the fluid actuator.

15. The method of claim 11, wherein indicating the fluid actuator to activate comprises setting a respective bit of the fluid actuator in a mask register of the fluid actuator controller.

* * * * *